United States Patent Office 3,230,178
Patented Jan. 18, 1966

3,230,178
BRIGHT PASTEL COMPOSITIONS CONTAINING
DAYLIGHT FLUORESCENT PIGMENTS
Daniel Bennahmias, Oakland, Calif., assignor to Radiant
Color Company, Oakland, Calif.
No Drawing. Filed Jan. 28, 1963, Ser. No. 254,421
9 Claims. (Cl. 252—301.3)

This invention relates to pastel compositions such as paints. For example, in the preferred embodiment it relates to pastel paints having an exceptional brightness and cleanliness of color made possible by the type of color pigment employed in its formulation.

As used herein the term "pastel" is consistent with customary usage of the term and has reference to any pale shade having a relatively low color saturation. The detailed description which follows is directed to a class of pastel coating composition, namely paint, but the concept of the invention and the use of the term pastel applies equally to other types of compositions in which coloration desirably exists. This will become clear after considering the paint compositions.

In accordance with the preferred embodiment of the present invention, there is provided a bright pastel paint comprising a white pigment having an index of refraction of at least about 1.8–2.0, a daylight fluorescent pigment in an amount sufficient to impart a pastel coloration to said white pigment, and a binder for said pigments. The foregoing paint is characterized by a vibrance of color that is here described as "bright" and "clean" for want of better terms in dealing with subject matter that inherently requires visual perception for a true comprehension of its qualities. Suffice it to state that a side by side comparison between conventional pastel paints and those of the present invention is not easily accomplished because the brightness of the present paints makes it appear that different colors are involved in what should otherwise be a comparison of similar colors. Adjacent to the present paints, conventional pastels appear dull, muddy, and unexciting.

These advantages of the present invention are not achieved at the expense of other desirable paint properties. In spite of the fact that fluorescent pigments are involved, the paint does not have a fluorescent appearance in the usual sense. Thus the present paints are quite as restful to the eye as conventional pastel paints and are therefore suitable for uses similar to that of conventional pastels. Further, the present paints are lightfast and color stable to a degree unexpected from a system containing fluorescent pigments and to a degree at least comparable to many conventional pastel paints.

This color fastness is in itself a most unexpected aspect of the present invention when considering the properties of fluorescent paints (as opposed to pastels) known to those skilled in the art. For example, when formulating fluorescent paints so as to be lightfast, it has been the practice to use as high a concentration of the pigment as possible. In general, it has been found that color fastness in conventional fluorescent paints is directly related to concentration of pigment—the more pigment the better lightfastness obtained. On the other hand, where relatively small amounts of pigment have been used, the lightfastness of the resultant paint was considerably impaired. Also, when employing fluorescent pigments, it has heretofore been necessary to use a system including a binder or paint vehicle where the system is of as high a transparency as possible in order to prevent loss of the fluorescent properties of the pigment.

The present paints are diametrically opposed to these prior techniques in the fluorescent paint art. In the present instance, relatively small quantities of fluorescent pigments are used to obtain the pastel shades, and it is preferable to use the most opaque white pigment possible therewith. Moreover, the present paints may be used to cover nonreflective surfaces, even black surfaces, and the paints retain their opacity and exhibit clean bright colors.

More specifically with respect to the composition of the new paints as noted above, they include three major components; namely, a white pigment, a fluorescent pigment, and a binder. The white pigment is preferably chosen so that its opacity is relatively high, with its index of refraction being at least about 1.8–2.0. The most satisfactory results are obtained where the index of refraction of the white pigment is at least about 2.5.

Any white pigment meeting these criteria may be used for the present purposes. A wide variety of white pigments having various indices of refraction have been used in formulating paints in accordance with the present invention. A list of these various materials will be found hereinafter in the description of an example of the formulation and testing of the paints. However, it has been found that titanium dioxide pigments are the most advantageous, particularly the rutile derived titanium dioxide pigments. While the optimum results are obtained with the higher index of refraction pigments such as titanium dioxide, it is contemplated that formulations are to be made wherein mixtures of white pigments having higher and lower indices of refraction are present. For example, in many applications a high index of refraction white pigment such as titanium dioxide may be "extended" with other pigments such as calcium sulfate. Amounts up to 50% by weight or more of extender with respect to the titanium dioxide may be employed with acceptable results.

Another major component of the present paints is the fluorescent pigment. This component is colored and supplies the means for imparting the pastel shade to the paint which is otherwise generally white due to the above described white pigment. Any suitable daylight fluorescent pigment may be used for this purpose provided it has the proper color desired for toning the white pigment and is compatible with the other components of the paint. Generally, the fluorescent pigment may be suitably selected from that group of fluorescent pigments comprising a conventional fluorescent dye such as any of the rhodamines or coumarins which has been dispersed in a resinous carrier and ground to an appropriate particle size. The resinous carriers may be chosen from any number of commercially available ones that are well known to those skilled in the art and which may generally comprise a co-condensed product including formaldehyde, an aromatic sulfonamide, and an aminotriazine. A daylight fluorescent pigment comprising a fluorescent dye in a co-condensed thermoplastic resinous carrier including benzoguanamine, formaldehyde, and toluene sulfonamide is suitably used in practicing the present invention.

Finally, the present paints include as a major component a conventional paint vehicle or binder. Any of the various binders used in the paint formulating art and which may be essentially acrylics, alkyds, water systems (acrylic emulsions) and the like may be used in the present paints. In the preferred embodiment, a binder comprising a combination of an acrylic ester resin and an acrylic modified alkyd resin has been used with success. The binder performs a function analogous to the part it plays in conventional paints and is used in quantities comparable to that in other types of systems. Generally, it is here used in an amount sufficient to cause the fluorescent pigment to be uniformly dispersed with respect to the white pigment and to cause the paint to adhere and last properly on the surface to which it is applied.

As noted above, the fluorescent pigment is used with respect to the white pigment in an amount sufficient to impart the desired amount of color to the white pigment and to the paint generally. Since the paint is to have a pastel shade, the amount of colored fluorescent pigment will be relatively small and generally will be a minor amount, i.e., less than 50% by weight with respect to the white pigment. The precise quantity of fluorescent pigment will depend on a number of factors aside from the final color desired. Thus the choice of binder may cause the amount of fluorescent pigment required to be varied in order to obtain a given pastel shade. For the binder system used in illustrating the preferred embodiment, it has been found that the fluorescent pigment is suitably selected so as to be up to about 45% by weight of the total solids content of the paint product. On the other hand other binder systems will have different upper limits. The lower level for the fluorescent pigment will, of course, be dictated by the color intensity desired and will necessarily be something greater than zero.

In the binder system of the preferred embodiment, the intensity of the pastel color increases gradually as the concentration of the fluorescent pigment is increased, up to the point where the fluoroescent pigment is about 45% by weight of the total paint solids. At this point a change occurs and the paint color appears to undergo a transition from what is here considered a non-fluorescent pastel to what is conventionally considered a fluorescent color.

There are other factors aside from binder choice that affect the point at which the increase in the concentration of the fluorescent pigment will convert the pastel paint to a paint having a fluorescent appearance. Additives to the binder such as wetting agents may cause a shift in the maximum permissible amount of fluorescent pigment that may be added to the paint before the paint is caused to become fluorescent.

Further variations may be caused by changes in the particle size of the fluorescent pigment. It has been found that a particle size of about 5–20 microns is most satisfactory for present purposes although larger and smaller particle sizes may be used. Using smaller particle sizes so that the pigment is, for example, a finely divided powder of about 1–5 microns average particle size causes the paint to have a stronger color intensity than with the same amount of pigment of the preferred particle size. However, the smaller particle size has the disadvantage of yielding a paint having an inferior lightfastness compared with that having the preferred particle size.

Still another factor involving the amount of colored pigment to be added is the specific gravity of the pigments used. Thus, where the white pigment has a relatively low specific gravity, the amount of fluorescent pigment added on a weight basis for a given volume is less than that added to make the same weight percent in the same volume of a white pigment of higher specific gravity.

Aside from the conversion of the pastel color to a fluorescent color by the addition of colored pigment beyond a particular concentration, the upper limit will be governed by other practical considerations. In general, the higher the concentration of colored pigment in a particular pastel paint, the poorer will be its lightfastness. Consequently, for many commercial purposes, the paints of the present invention will likely employ colored pigments in relatively low concentration. This coincides with the public preference for the lighter pastel shades. Of course, where color stability is of less importance higher concentrations will be used.

In view of the foregoing, it should be clear that where two different white pigments have similar indices of refraction and the same colored pigment at the same weight percent is combined with each white pigment, the resulting paints will not necessarily be of equal color stability. The difference may be due to a difference in the specific gravities of the white pigments which required a smaller amount of colored pigment to be added to the white pigment of higher specific gravity. As noted above, the greater concentration of colored pigment generally imparts less lightfastness to the paint.

Aside from the major components, any of the conventional paint additives are suitably employed. Thus paint thinner solvents may be added as desired as well as driers, anti-skinning agents, and the like. These, as well as the above noted major components, are combined to formulate the paint by conventional techniques as will be seen in the specific examples which follow.

A series of paints are made using the following components and procedure:

Component:
1. Acryloid B–66 _____ (Thermoplastic acrylic ester resin.)
2. Amberlac 292–X _____ (Acrylic modified polyester (alkyd) resin, 48% solids in xylol.)
3. Thinner, Socal #2 ____ (Aromatic petroleum hydrocarbon solvent, distillation range 281–330° F., Kauri-Butanol Value 91.)
4. Thinner, Socal #355–L _ (Aromatic petroleum hydrocarbon solvent, distillation range 321–387° F., Kauri-Butanol Value 65.)
5. Cobalt Octoate _____ (6% cobalt metal, drier.)
6. Exkins #2 _____, (Anti-skinning agent.)
7. White pigment.
8. Daylight fluorescent pigment.

PAINT PREPARATION PROCEDURE

A solution was prepared with 40 parts of Acryloid B-66 and 60 parts of Thinner, Socal #2. This solution for convenience will hereinafter be labeled "A." A formula containing 60% of a white pigment, 15% of solution A, and 25% of Amberlac 292–X (by weight) are mixed together and dispersed in a three roll mill. The dispersed materials are placed in a high speed mixer and a fluorescent pigment is added with continuous stirring until completely dispersed. The balance of the binder (solution A and Amberlac 292–X) are added together with .063 part (by weight of total weight of paint) of Cobalt Octoate, .050 part (by weight of total paint) of the anti-skinning agent, and the solvent Socal #355–L.

The above procedure, as will be understood by those skilled in the art, is subject to variation and is offered merely as a workable and satisfactory guide for the dispersion stage. The proportion, for dispersion purposes, may be varied depending upon the oil absorption of the pigments used (high oil absorption pigments may require greater amounts of binder and vice versa).

Employing the above general composition of the paint and procedure for its formulation, a series of white pigments were evaluated in combination with a daylight fluorescent pigment comprising a daylight fluorescent dye in a conventional co-condensed resinous carrier of formaldehyde, toluene sulfonamide, and aminotriazine. The fluorescent pigment consistuted about 5% by weight of the total paint solids. The paints included the following components in parts by weight as shown in Table I. Table II provides a more complete description of the materials listed as white pigments in Table I.

fractive index and high opacity pigments such as $TiO_2$ or $TiO_2$ in combination with a filler, while the paints which

*Table I*

| White pigments (See Table II for complete description) | Parts | Index of refraction | Fluorescent pigment | Amberlac 292-X | Solution A | Socal 355-L |
|---|---|---|---|---|---|---|
| 1. $TiO_2$ rutile R-900 | 36.0 | 2.70 | 3.3 | 18.8 | 22.5 | 10.7 |
| Clay ASP-101 | 12.0 | 1.56 | | | | |
| | 48.0 | | | | | |
| 2. $TiO_2$ rutile R-900 | 27.8 | 2.70 | 3.2 | 25.0 | 16.0 | 12.8 |
| Clay ASP-170 | 18.4 | 1.56 | | | | |
| | 46.2 | | | | | |
| 3. $TiO_2$ Anatase LO-CR | 27.8 | 2.50 | 3.2 | 25.0 | 16.0 | 12.8 |
| Clay ASP-170 | 18.4 | 1.56 | | | | |
| | 46.2 | | | | | |
| 4. $TiO_2$ rutile R-900 | 48.9 | 2.70 | 3.4 | 26.5 | 17.0 | 7.6 |
| 5. $TiO_2$ Anatase LO-CR | 49.1 | 2.50 | 3.4 | 26.4 | 17.0 | 7.5 |
| 6. Clay ASP-170 | 22.6 | 1.56 | 3.2 | 24.2 | 15.5 | 15.1 |
| Purecal-U-calcium carbonate | 22.6 | 1.50 | | | | |
| | 45.2 | | | | | |
| 7. Syloid PD-244 | 16.1 | 1.54 | 2.2 | 37.8 | 24.5 | 21.6 |
| 8. Lithopone | 48.9 | 1.84 | 3.4 | 26.5 | 17.0 | 7.6 |
| 9. Zinc oxide | 46.6 | 2.01 | 3.3 | 25.0 | 16.3 | 12.1 |
| 10. Titanox C-50: Ca 804, Rutile $TiO_2$ | 48.9 | 1.98 | 3.4 | 26.5 | 17.0 | 7.6 |
| 11. Mistron talc | 43.7 | 1.57 | 3.1 | 23.6 | 15.3 | 17.4 |
| 12. $TiO_2$ rutile Unitane OR-540 | 48.9 | 2.70 | 3.4 | 26.5 | 17.0 | 7.6 |
| 13. $TiO_2$ rutile R-750 | 48.9 | 2.70 | 3.4 | 26.5 | 17.0 | 7.6 |
| 14. $TiO_2$ Anatase Titanox A-MO | 48.9 | 2.50 | 3.4 | 26.5 | 17.0 | 7.6 |
| 15. Vicron whiting | 48.9 | 1.56 | 3.4 | 26.5 | 17.0 | 7.6 |
| 16. Celite 281 diatonite | 35.9 | 1.45 | 2.8 | 28.2 | 18.3 | 17.6 |
| 17. Asbestine #625 | 36.3 | 1.57 | 2.9 | 28.6 | 18.5 | 16.6 |

*Table II*

| White pigments | Description | Manufacturer |
|---|---|---|
| a. Ti Pure R-900 | Rutile $TiO_2$, refractive index approximately 2.70. | Du Pont Company. |
| b. ASP #101 Clay | Aluminum silicate pigment, refractive index 1.56. | Minerals & Chemicals Phillipp Corporation. |
| c. ASP #170 Clay | do | Do. |
| d. Ti Pure LO-CR | Anatase $TiO_2$, refractive index about 2.50. | Du Pont Company. |
| e. Purecal-U | Precipitated, ultra fine, calcium carbonate, refractive index about 1.50. | Wyandotte Chemicals Corp. |
| f. Syloid PD-244 | Colloidal silica, low refractive index. | Davison Chemical Company. |
| g. Permolith 461-Mq | Lithopone, refractive index about 1.84. | Sherwin-Williams Company. |
| h. Zinc oxide XX-50 | | New Jersey Zinc Company. |
| i. Titanox C-50 | Composite rutile $TiO_2$ (50%), Calcium sulfate extender (50%). | Titanium Pigment Corp. |
| j. Mistron Talc | T-076, magnesium silicate. | Sierra Talc & Clay Company. |
| k. Timonox | Antimony oxide. | National Lead Co. |
| l. Unitane OR-540 | Rutile $TiO_2$. | American Cyanamid. |
| m. R-750 | Rutile $TiO_2$. | Titanium Pigment Corp. |
| n. Titanox A-MO | Anatase $TiO_2$. | Do. |
| o. Vicron | Calcium carbonate whiting. | C. K. Williams Co. |
| p. Celite 281 | Calcined diatomaceous silica. | Johns-Manville Company. |
| q. Asbestine #625 | Magnesium silicate (talc). | International Talc Co., Inc. |

Paints having the formulas as numbered and described in Table I were applied on white surfaces with a .003″ Bird applicator (film thickness of the dry film approximately 1 mil) and air dried overnight at room temperature. Portions of the dried surfaces were exposed in the Atlas FDA-R Fadometer for a period of 22 hours. The exposed portions representing paints No. 1, 2, 3, 4, 5, 8, 9, 10, 12, 13, 14 retained substantially the same color as the respective unexposed surfaces, while the ones representing paints No. 6, 7, 11, 15, 16, 17 showed pronounced fading and consequently substantial change in color. It is noted that all of the paints which maintained substantially their color value after exposure were prepared with high refailed to maintain their color on exposure were made with fillers of mediocre opacity and low index of refraction.

A second set of surfaces prepared in the same manner as described above were exposed in the Atlas FDA-R Fadometer for approximately 100 hours with the following results: The surfaces prepared with paints No. 1, 2, 3, 4, 5, 8, 9, 10 were still maintaining substantially the same color of the unexposed surfaces while the ones prepared with paints No. 6, 7, 11 showed pronounced fading and color change. The balance of the paints (Nos. 12, 13, 14, 15, 16, 17) are still under evaluation.

Paint No. 8 utilizing Lithopone as the white pigment exhibited more color change than the paints having the white pigments of higher indices of refraction. This is, of course, consistent and to be expected since its index of refraction was about 1.84, and therefore in the area of the minimum acceptable index of refraction.

Of the exposed surfaces which retained substantially their initial color the ones which appear to have been the least affected were the ones representing paints No. 4, 10, 12, 13 and were prepared with $TiO_2$ rutile pigment.

Although the foregoing invention has been described in some detail by way of illustration and example for purposes of clarity of understanding, it is understood that certain changes and modifications may be practiced within the spirit of the invention is limited only by the scope of the appended claims. For example, the invention has been described with reference to daylight fluorescent pigments. It will be appreciated by those skilled in the art that the invention is applicable to daylight fluorescent materials in general whether they be solids, liquids, or some other variation. Further, these materials have been described in relation to the formulation of paint by virtue of the type of binder selected. Where other types of compositions are desired it is only necessary to substitute the appropriate binder. Thus, the fluorescent materials and the white pigment may be mixed into a polyethylene or polystyrene binder to provide a bright pastel plastic composition of any suitable configuration by extrusion or other manipulated technique.

What is claimed is:

1. A bright pastel composition consisting essentially of a white pigment having an index of refraction of at least about 1.8–2.0, a daylight fluorescent pigment in an amount sufficient to impart a pastel coloration to said white pigment, but insufficient to render said composition daylight fluorescent and a binder for said pigments.

2. A bright pastel paint consisting essentially of a white pigment having an index of refraction of at least about 2.5, a daylight fluorescent pigment in an amount sufficient to impart a pastel coloration to said white pigment, but insufficient to render said paint daylight fluorescent and a binder for said pigments.

3. A paint in accordance with claim 2 wherein said white pigment comprises titanium dioxide.

4. paint an accordnace with claim 2 wherein said white pigment comprises titanium dioxide and further includes a white extender therefor.

5. A bright pastel paint consisting essentially of a white pigment having an index of refraction of at least about 1.8–2.0, a daylight fluorescent dye in a resinous carrier in combination with said white pigment in an amount sufficient to impart a pastel coloration thereto, but insufficient to render said paint daylight fluorescent and a binder for said white pigment and said fluorescent dye and carrier.

6. A paint in accordance with claim 5 wherein said resinous carrier comprises an aminotriazine-formaldehyde-toluene sulfonamide co-condensed resin.

7. A bright pastel paint consisting essentially of a white pigment having an index of refraction of at least 1.8–2.0, a daylight fluorescent pigment in an amount up to about 45% by weight of the total solids of said pastel paint sufficient to impart a pastel coloration thereto, but insufficient to render said paint daylight fluorescent and a binder for said pigments comprising a combination of an acrylic ester resin and an acrylic modified alkyd resin.

8. A paint in accordance with claim 7 wherein said daylight fluorescent pigment is a daylight fluorescent dye dispersed in an aminotriazine-formaldehyde-toluene sulfonamide resinous carrier having a particle size of about 5–20 microns.

9. A bright pastel paint consisting essentially of a titanium dioxide white pigment, a daylight fluorescent pigment in an amount up to about 45% by weight of the total solids of said pastel paint sufficient to impart a pastel coloration thereto, but insufficient to render said paint daylight fluorescent and a binder for said pigments comprising a combination of an acrylic ester resin and an acrylic modified alkyd resin.

References Cited by the Examiner
UNITED STATES PATENTS

| | | | |
|---|---|---|---|
| 2,938,873 | 5/1960 | Kazenas | 252—301.3 |
| 3,030,870 | 4/1962 | Gill | 252—301.2 |
| 3,125,536 | 3/1964 | Obrien | 252—301.3 |

TOBIAS E. LEVOW, *Primary Examiner.*

MAURICE A. BRINDISI, *Examiner.*

R. D. EDMONDS, *Assistant Examiner.*

Dedication 3,230,178.—*Daniel Bennahmias*, Oakland, Calif. BRIGHT PASTEL COMPOSITIONS CONTAINING DAYLIGHT FLUORESCENT PIGMENTS. Patent dated Jan. 18, 1966. Dedication filed Sept. 18, 1972, by the assignee, *Hercules Incorporated*.
Hereby dedicates said patent to the Public.
[*Official Gazette November 13, 1973.*]